United States Patent
Kuwayama et al.

(10) Patent No.: US 12,053,876 B2
(45) Date of Patent: Aug. 6, 2024

(54) WORKPIECE TRANSPORTATION MEMBER, WORKPIECE TRANSPORTATION DEVICE, AND HEAT TREATMENT DEVICE

(71) Applicant: NIPPON STEEL TEXENG. CO., LTD., Tokyo (JP)

(72) Inventors: Shinjiro Kuwayama, Tokyo (JP); Ryousuke Morimoto, Tokyo (JP)

(73) Assignee: NIPPON STEEL TEXENG. CO., LTD., Tokyo (JP)

(*) Notice: Subject to any disclaimer, the term of this patent is extended or adjusted under 35 U.S.C. 154(b) by 866 days.

(21) Appl. No.: 16/973,727

(22) PCT Filed: Apr. 11, 2019

(86) PCT No.: PCT/JP2019/015772
§ 371 (c)(1),
(2) Date: Dec. 9, 2020

(87) PCT Pub. No.: WO2019/239700
PCT Pub. Date: Dec. 19, 2019

(65) Prior Publication Data
US 2021/0245370 A1  Aug. 12, 2021

(30) Foreign Application Priority Data
Jun. 15, 2018  (JP) ................. 2018-114113

(51) Int. Cl.
*B25J 15/00* (2006.01)
*B65H 5/00* (2006.01)
(52) U.S. Cl.
CPC ............ *B25J 15/0014* (2013.01); *B65H 5/00* (2013.01)

(58) Field of Classification Search
CPC ............... B25J 15/0014; B25J 11/0095; H01L 21/68707; B65G 49/061; Y10S 414/141; B65H 5/00
(Continued)

(56) References Cited

U.S. PATENT DOCUMENTS 6,634,686 B2 * 10/2003 Hosokawa ........ H01L 21/68707
  294/902
7,073,834 B2 * 7/2006 Matsumoto ....... H01L 21/67742
  294/902
(Continued)

FOREIGN PATENT DOCUMENTS

CN  1607169 A   4/2005
CN  103684036 A  3/2014
(Continued)

OTHER PUBLICATIONS

English translation of Japanese patent JP 2012-213815. (Year: 2012).*
(Continued)

*Primary Examiner* — Dean J Kramer
(74) *Attorney, Agent, or Firm* — Birch, Stewart, Kolasch & Birch, LLP

(57) ABSTRACT

This workpiece transportation member includes at least one pair of support beams that each have a configuration where a placing portion configured to allow a heated workpiece to be placed is provided at an upper end portion, extend in a predetermined length direction, and are disposed at an interval in a width direction orthogonal to the length direction and a connecting portion configured to connect the at least one pair of support beams to each other at a position below the position of the upper end portion.

5 Claims, 7 Drawing Sheets

(58) Field of Classification Search
USPC .......................................................... 294/213
See application file for complete search history.

(56) References Cited

U.S. PATENT DOCUMENTS

| | | | |
|---|---|---|---|
| 2005/0211531 A1 | 9/2005 | Kim et al. | |
| 2005/0269826 A1* | 12/2005 | Kobayashi | B29C 70/345 |
| | | | 294/11 |
| 2006/0011507 A1 | 1/2006 | Uchida et al. | |
| 2008/0247857 A1* | 10/2008 | Yuasa | B65G 49/067 |
| | | | 901/30 |
| 2018/0304476 A1 | 10/2018 | Kushida et al. | |

FOREIGN PATENT DOCUMENTS

| | | |
|---|---|---|
| CN | 107651389 A | 2/2018 |
| JP | 5-96202 A | 4/1993 |
| JP | 7-187329 A | 7/1995 |
| JP | 2001-79790 A | 3/2001 |
| JP | 2002-346965 A | 12/2002 |
| JP | 2005-340480 A | 12/2005 |
| JP | 2006-123135 A | 5/2006 |
| JP | 2008-279590 A | 11/2008 |
| JP | 2012-213815 A | 11/2012 |
| JP | 2013-103331 A | 5/2013 |
| JP | 2017-74643 A | 4/2017 |
| JP | 2017-104931 A | 6/2017 |

OTHER PUBLICATIONS

International Search Report for PCT/JP2019/015772 (PCT/ISA/210) mailed on Jul. 16, 2019.
Chinese Office Action and Search Report for corresponding Chinese Application No. 201980039579.3, dated Jun. 1, 2023, with an English translation of the Search Report.

* cited by examiner (A) SECOND MODIFICATION EXAMPLE (B) THIRD MODIFICATION EXAMPLE

FOURTH MODIFICATION EXAMPLE

WORKPIECE TRANSPORTATION MEMBER, WORKPIECE TRANSPORTATION DEVICE, AND HEAT TREATMENT DEVICE

TECHNICAL FIELD OF THE INVENTION

The present invention relates to a workpiece transportation member, a workpiece transportation device, and a heat treatment device, and particularly to a workpiece transportation member, a workpiece transportation device, and a heat treatment device that are suitable for the transportation and heat treatment of steel sheets for hot pressing.

The present application claims priority based on Japanese Patent Application No. 2018-114113 filed in Japan on Jun. 15, 2018, the contents of which are incorporated herein by reference.

RELATED ART

High strength steel sheets are widely used as the components of automobile bodies in order to achieve both additional improvement in the strength, stiffness, and collision safety of automobile bodies and improvement in gas mileage by the weight reduction of automobile bodies. However, the press formability of steel sheets degrades with the high-strengthening of steel sheets. Therefore, there is a case where it is not possible to manufacture high-strength press-formed articles having a desired shape.

Recently, hot pressing methods (also referred to as hot stamping methods) have been used as methods for press-forming the components of automobile bodies. In the hot pressing methods, steel sheets for hot pressing (blanks) that are subjected to press forming are press-formed and quenched by rapid cooling immediately after being heated to a temperature that is equal to or higher than the $Ac_3$ point with a heating apparatus. This treatment is also referred to as die quenching. With this treatment, high-strength press-formed articles having a desired shape are manufactured.

In order to load and unload steel sheets for hot pressing or the like as workpieces into and from heating furnaces, there is a case where loading and unloading devices are used (for example, refer to Patent Document 1). A loading and unloading device described in Patent Document 1 has a robot arm and a fork-shaped hand attached to the tip end of the robot arm.

The hand is configured to have a plurality of elongated rod-shaped forks arranged in parallel. Each fork typically has a quadrangular cross-sectional shape that is orthogonal to the length direction of the fork. In addition, a planar shaped workpiece is placed on each fork.

PRIOR ART DOCUMENT

Patent Document

[Patent Document 1] Japanese Unexamined Patent Application, First Publication No. 2013-103331

DISCLOSURE OF THE INVENTION

Problems to be Solved by the Invention

When a hot workpiece is placed on the upper surface of the fork, the fork receives radiation heat from the workpiece. The radiation heat mainly transmits in the upper portion of the fork. Therefore, the temperature of the upper portion of the fork significantly rises. On the other hand, the temperature of the lower portion of the fork does not significantly rise. As a result, in the fork, the amount of thermal expansion of the upper portion becomes larger than the amount of thermal expansion of the lower portion. Then, the fork, particularly the tip end of the fork, warps downward.

As the warpage amount of the fork increases, the total height of the fork and the workpiece placed on the fork increases. When the total height increases, the fork and the workpiece come into contact with the inlet and outlet of a heating furnace during the transportation of the workpiece. As a result, there is a concern that a trouble of the heat treatment furnace or the fork being broken and a trouble of the workpiece being damaged may be caused.

In order to prevent the above-described warpage of the fork, Patent Document 1 discloses a configuration where a cover member having a high radiation heat reflectance is overlaid on the upper surface of the fork. This configuration is intended to make the amount of thermal expansion more even between the upper portion and the lower portion of the fork. In addition, in order to prevent the warpage of the fork, conceivable is a configuration where the fork is formed of a material that is divided into upper and lower portions and the coefficient of thermal expansion of the upper member is made smaller than the coefficient of thermal expansion of the lower member.

However, in the above-described configuration where the cover member is used, a material that configures the cover member becomes necessary in addition to a material that configures the fork, which increases the manufacturing cost of the hand. In addition, in the configuration where the coefficient of thermal expansion is changed between the upper portion and the lower portion of the fork, two different kinds of materials are used, and there is a need for a special process of the combination of these materials, which increases the manufacturing cost of the fork.

In addition, when the heating pattern of workpieces and the heating temperature of workpieces (hereinafter, also referred to as the heating pattern of workpieces and the like) vary, the warpage amount of the fork that receives heat from workpieces also varies. Therefore, in a case where the cover member is used, there is a need for changing the thickness of the cover member in the fork according to the heating pattern of workpieces and the like. As a result, it becomes necessary to prepare a large number of kinds of hands according to the heating pattern of workpieces and the like. In addition, in a case where the coefficient of thermal expansion is changed between the upper portion and the lower portion of the fork, there is a need for selecting a material having a coefficient of thermal expansion in accordance with the heating pattern of workpieces and the like. As a result, it becomes necessary to prepare a large number of kinds of hands.

In consideration of the above-described circumstances, an object of the present invention is to provide a workpiece transportation member, a workpiece transportation device, and a heat treatment device that are capable of suppressing the occurrence of warpage attributed to heat that comes from workpieces and require a low cost relating to the transportation of workpieces.

Another object of the present invention is to provide a workpiece transportation member, a workpiece transportation device, and a heat treatment device that are capable of further improving the operating rate of the heat treatment device configured for the heat treatment of workpieces.

Means for Solving the Problem (1) In order to solve the above-described problem, a workpiece transportation member according to an aspect of this invention includes at least one pair of support beams that each have a configuration where a placing portion configured to allow a heated workpiece to be placed is provided at an upper end portion, extend in a predetermined length direction, and are disposed at an interval in a width direction orthogonal to the length direction and a connecting portion configured to connect the at least one pair of support beams to each other at a position below a position of the upper end portion.

For example, in a configuration where a first connecting portion configured to connect the upper portions of a plurality of support beams and a second connecting portion configured to connect the lower portions of the plurality of support beams are provided, the elongation amount of the first connecting portion and the elongation amount of the second connecting portion, which are attributed to radiation heat from workpieces, are different from each other. As a result, the support beam warps such that the elongation amount of the upper end portion of the support beam, which is attributed to radiation heat, becomes larger than the elongation amount of the lower end portion of the support beam. On the other hand, according to the configuration (1) described above, it is possible to connect the support beams with one connecting portion. With such a configuration, it is possible to more reliably suppress the occurrence in the support beam of the warpage of the workpiece transportation member, particularly, warpage causing the elongation amount of the upper end portion of the support beam, which is attributed to radiation heat from the workpiece, to be larger than the elongation amount of the lower end portion of the support beam. Moreover, it is possible to form the workpiece transportation member with a single material, and thus it is possible to further reduce the manufacturing cost of the workpiece transportation member. In addition, it is possible to suppress the warpage of the workpiece transportation member regardless of the heating pattern of the workpiece and the heating temperature of the workpiece. Therefore, it is not necessary to replace the workpiece transportation member according to workpieces having a different heating pattern of the workpiece and the like, and the same workpiece transportation member can be used. Therefore, since it is possible to decrease the replacement frequency of the workpiece transportation member in the step of heat-treating workpieces, a low cost relating to the transportation of workpieces is required, and it is possible to further improve the operating rate of the heat treatment device in which the workpiece transportation member is used.

(2) There is a case where the connecting portion connects the at least one pair of support beams to each other at one place in a height direction orthogonal to both the length direction and the width direction.

According to this configuration, it is possible to more reliably suppress the occurrence in the support beam of the warpage of the workpiece transportation member, particularly, warpage causing the elongation amount of the upper end portion of the support beam to be larger than the elongation amount of the lower end portion of the support beam.

(3) There is a case where two support beams are provided at an interval in the width direction, and each support beam is formed in a flat plate shape having the width direction as the thickness direction.

According to this configuration, it is possible to stably support workpieces with the two support beams while the amount of heat transmitting from the workpieces to the workpiece transportation member is further reduced by further decreasing the contact area between the workpieces and each support beam.

(4) There is a case where the connecting portion is disposed in a middle portion of the support beam in the height direction, whereby the workpiece transportation member is formed in an H shape when viewed in the length direction.

According to this configuration, it is possible to realize the workpiece transportation member having extremely high bending rigidity against the load of workpieces. In addition, since it is possible to decrease the projected area of the connecting portion when viewed from the upper end side of the support beam, it is possible to decrease the influence of radiation heat from workpieces. As a result, it is possible to more reliably suppress the warpage of the support beam attributed to the radiation heat. Furthermore, it is possible to make the temperature distribution of the support beam in the thickness direction of the support beam, which is attributed to the conduction of heat from workpieces more even. Therefore, it is possible to more reliably suppress the occurrence of a temperature difference in the support beam that causes large warpage.

(5) There is a case where the connecting portion is disposed in a lower end portion of the support beam in the height direction, whereby the workpiece transportation member is formed in a U shape when viewed in the length direction.

According to this configuration, it is possible to realize the workpiece transportation member having sufficiently enhanced bending rigidity against the load of workpieces.

(6) There is a case where the connecting portion is formed in a plate shape extending in the length direction.

According to this configuration, the connecting portion continuously extends in the length direction, whereby it is possible to further enhance the coupling stiffness between the connecting portion and the support beam. As a result, the workpiece transportation member is capable of further decreasing the deflection amount (subduction amount) of the workpiece transportation member on the tip end side when a workpiece is placed on the workpiece transportation member.

(7) There is a case where a plurality of the connecting portions are provided at an interval in the length direction.

According to this configuration, the plurality of connecting portions support the support beams in cooperation with each other, whereby it is possible to further enhance the coupling stiffness between the connecting portion and the support beam. As a result, the workpiece transportation member is capable of further decreasing the deflection amount of the workpiece transportation member on the tip end side when a workpiece is placed on the workpiece transportation member. Furthermore, the connecting portions are capable of reducing the amount of radiation heat received from the workpiece. As a result, it is possible to more reliably suppress the warpage of the support beam attributed to the radiation heat.

(8) In order to solve the above-described problem, a workpiece transportation device according to an aspect of this invention includes a workpiece transportation fork formed in a fork shape as a whole by having a configuration where a plurality of the workpiece transportation members are arranged in the width direction.

According to this configuration, the workpiece transportation fork is formed of the workpiece transportation members in which warpage attributed to heat from the workpiece is suppressed. Therefore, when a workpiece is placed on the workpiece transportation device, it is possible to more reliably suppress the occurrence of the warpage of the workpiece transportation member. In addition, since it is possible to suppress the warpage of the workpiece transportation member regardless of the heating pattern of the workpiece and the like, it is not necessary to replace the workpiece transportation fork according to workpieces having a different heating pattern of the workpiece and the like, and the same workpiece transportation fork can be used. Therefore, it is possible to decrease the replacement frequency of the workpiece transportation fork in the step of heat-treating the workpiece, and thus it is possible to further improve the operating rate of the heat treatment device in which the workpiece transportation member is used.

(9) In order to solve the above-described problem, a heat treatment device according to an aspect of the present invention includes the workpiece transportation device and a heating furnace configured to heat a workpiece that is transported by the workpiece transportation device.

According to this configuration, it is possible to more reliably suppress the occurrence of warpage in the workpiece transportation member. In addition, since it is possible to suppress the warpage of the workpiece transportation member regardless of the heating pattern of the workpiece and the like, it is not necessary to replace the workpiece transportation fork according to workpieces having a different heating pattern of the workpiece and the like, and the same workpiece transportation fork can be used. Therefore, it is possible to decrease the replacement frequency of the workpiece transportation fork in the heat treatment device, and thus it is possible to further increase the efficiency of the operation for loading and unloading workpieces into and from the heat treatment furnace and to further improve the operating rate of the heat treatment device.

Effects of the Invention

According to the present invention, it is possible to realize a workpiece transportation member that is capable of suppressing the occurrence of warpage attributed to heat that comes from workpieces and requires a low cost relating to the transportation of workpieces.

EMBODIMENTS OF THE INVENTION

Hereinafter, an embodiment for carrying out the present invention will be described with reference to drawings.

Figure 1:
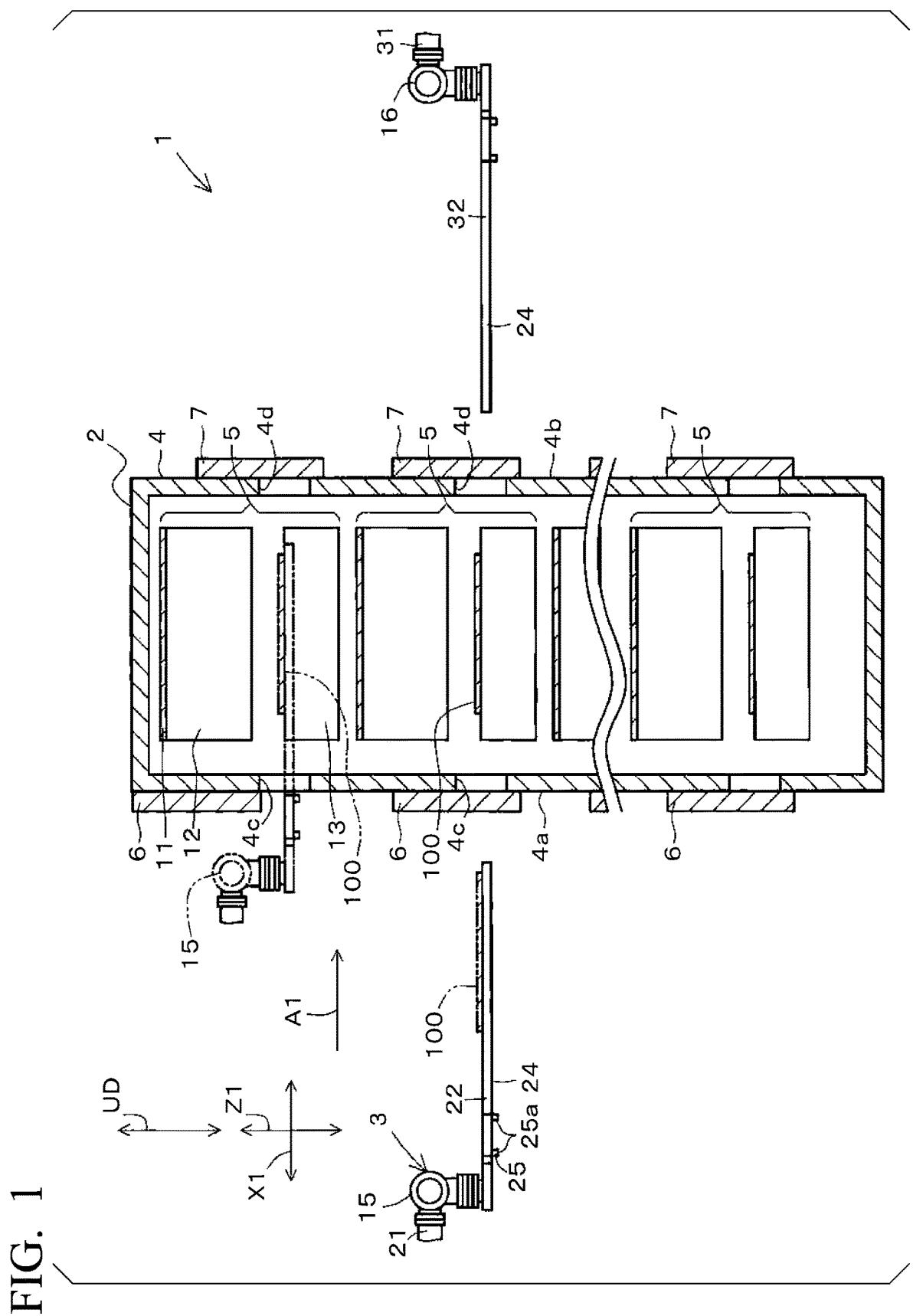
FIG. 1 is a schematic partial cross-sectional side view of a heat treatment device according to an embodiment of the present invention and shows only a part of the heat treatment device.
Figure 2:
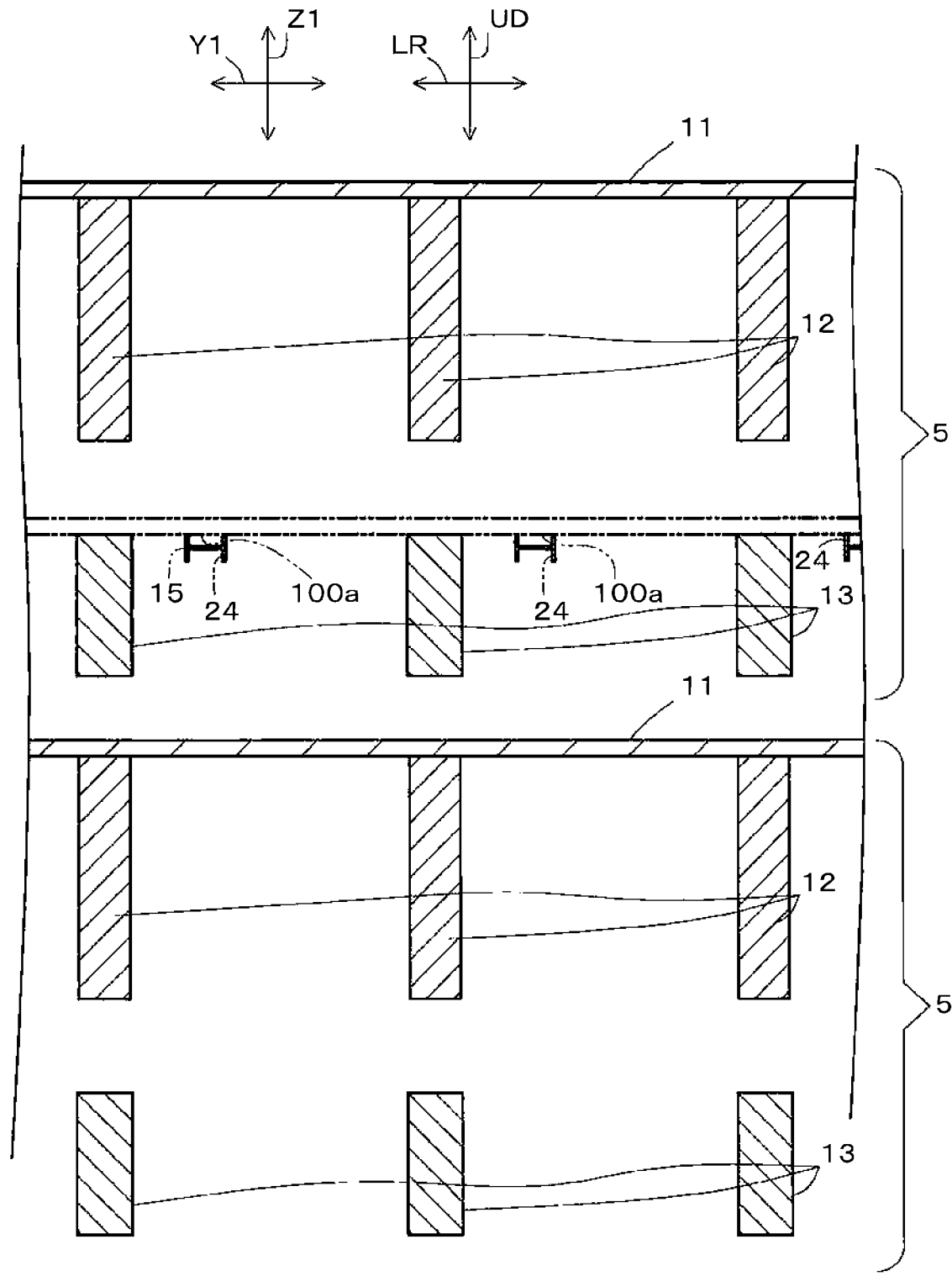
FIG. 2 is a schematic view showing the configuration of a main part of a heat treatment furnace in the heat treatment device and shows a cross section orthogonal to a transportation direction of a workpiece.

FIG. 1 is a schematic partial cross-sectional side view of a heat treatment device 1 according to an embodiment of the present invention and shows only a part of the heat treatment device 1. FIG. 2 is a schematic view showing the configuration of a main part of a heat treatment furnace 2 in the heat treatment device 1 and shows a cross section orthogonal to a transportation direction A1 of a workpiece 100.

With reference to FIG. 1 and FIG. 2, the heat treatment device 1 is a device configured to heat steel sheets for hot pressing as the workpiece 100 for hot pressing processes. The workpiece 100 is heated in the heat treatment device 1 in a state of being formed in, for example, a rectangular flat plate shape. The heat treatment device 1 heats the workpiece 100 to, for example, the $Ac_3$ point or higher and 950° ° C. or lower. The workpiece 100 is heated in the heat treatment device 1 and then formed into a predetermined member by a hot pressing process. Examples of the predetermined member include pillars, members, and the like in the monocoque structures of automobiles.

The heat treatment device 1 has the heat treatment furnace 2 and a workpiece transportation device 3.

The heat treatment furnace 2 is a furnace configured to heat the workpiece 100 that is transported by the workpiece transportation device 3 to, for example, the $Ac_3$ point or higher and 950° C. or lower. The heat treatment furnace 2 is a far-infrared type multistage heating furnace and is capable of collectively accommodating N (N is a natural number of one or larger, for example, N=7) workpieces 100.

The heat treatment furnace 2 has a housing 4, N heater units 5 installed in the housing 4, N inlet shutters 6 and N outlet shutters 7 configured to open and close the housing 4.

The housing 4 is formed in, for example, a substantially square prism shape that is hollow. In addition, in the housing 4, the upstream-side side wall in the transportation direction A1 (the horizontal direction in FIG. 1) of the workpiece 100 in the heat treatment device 1 is an inlet-side side wall 4a. In addition, the downstream-side side wall in the transportation direction A1 is an outlet-side side wall 4b. Opening parts 4c and 4d for passing the workpiece 100 are formed in the inlet-side side wall 4a and the outlet-side side wall 4b.

N opening parts 4c are formed vertically on the inlet side at substantially equal pitches. Similarly, N opening parts 4d on the outlet side are formed vertically at substantially equal pitches. The opening part 4c preferably has a minimum necessary height that is large enough for a workpiece transportation fork 22, which will be described below, of the workpiece transportation device 3 and the workpiece 100 placed on the workpiece transportation fork 22 to be inserted. The opening part 4d preferably has a minimum necessary height that is large enough for a workpiece transportation fork 32, which will be described below, of the workpiece transportation device 3 and the workpiece 100 placed on the workpiece transportation fork 32 to be inserted. As the height of each opening part 4c and the height dimension of each opening part 4d decrease, it is possible to further shorten the intervals between the heater units 5.

Therefore, it is possible to further increase the heat efficiency of the heat treatment furnace 2.

The inlet shutters 6 are disposed on the plurality of opening parts 4c, respectively, and the outlet shutters 7 are disposed on the plurality of opening parts 4d, respectively. The inlet shutters 6 and the outlet shutters 7 are opened and closed with an opening and closing mechanism, not shown, thereby opening and closing the corresponding opening parts 4c and 4d.

The heater unit 5 is disposed between the opening part 4c and the opening part 4d arranged in the transportation direction A1. That is, N heater units 5 are disposed between N opening parts 4c and N opening parts 4d that are arranged in the transportation direction A1 and form pairs, respectively. The heater units 5 that are adjacent to each other vertically are not separated with a partition wall or the like. Therefore, the heater units 5 that are adjacent to each other vertically face each other directly.

Each heater unit 5 has a far-infrared heater 11, a heater support material 12, and a workpiece support material 13.

The far-infrared heater 11 is a horizontally-disposed planar heater. The far-infrared heater 11 has a sintered body of far-infrared radiation ceramics, for example, $Al_2O_3$, $SiO_2$, $ZrO_2$, $TiO_2$, SiC, CoO, $Si_3N_4$, or the like and a heating wire provided in the sintered body. When an electric current is made to flow through this heating wire, far-infrared energy is radiated from the far-infrared heater 11. The far-infrared heater 11 is supported by a plurality of the heater support materials 12.

Each heater support material 12 is supported by the housing 4. The far-infrared heater 11 is placed on each heater support material 12. The workpiece support material 13 is disposed below the far-infrared heater 11 and the heater support material 12.

The workpiece support materials 13 are arranged at substantially equal pitches in the horizontal direction LR when viewed along the transportation direction A1. Each workpiece support material 13 is, for example, a block-shaped member extending along the transportation direction A1 and is supported by the housing 4. The workpiece 100 is placed on the plurality of workpiece support materials 13. The plurality of workpiece support materials 13 collaboratively support the workpiece 100 such that the workpiece 100 comes to a horizontal posture.

With the above-described configuration, at the time of heating the workpiece 100, first, the inlet shutter 6 that closes the opening part 4c, into which the workpiece is loaded, is opened. Next, a workpiece loading device 15, described below, in the workpiece transportation device 3 transports the workpiece 100 to the corresponding workpiece support material 13 through the opening part 4c in an open state and places the workpiece 100 on the workpiece support material 13. Next, the inlet shutter 6 is closed. After that, the workpiece 100 is heated with the heater unit 5. When this heating operation is completed, the outlet shutter 7 that faces the workpiece 100 is opened, whereby the corresponding opening part 4d is opened.

Next, a workpiece unloading device 16, described below, in the workpiece transportation device 3 lifts the workpiece 100 from the workpiece support material 13 and unloads the workpiece 100 to the outside of the heat treatment furnace 2 through the opening part 4d in an open state. The workpiece 100 transported to the outside of the heat treatment furnace 2 is formed into a predetermined shape by a hot pressing process with a hot pressing apparatus, not shown.

Next, the configuration of the workpiece transportation device 3 will be described.

The workpiece transportation device 3 has the workpiece loading device 15 and the workpiece unloading device 16.

Figure 3:
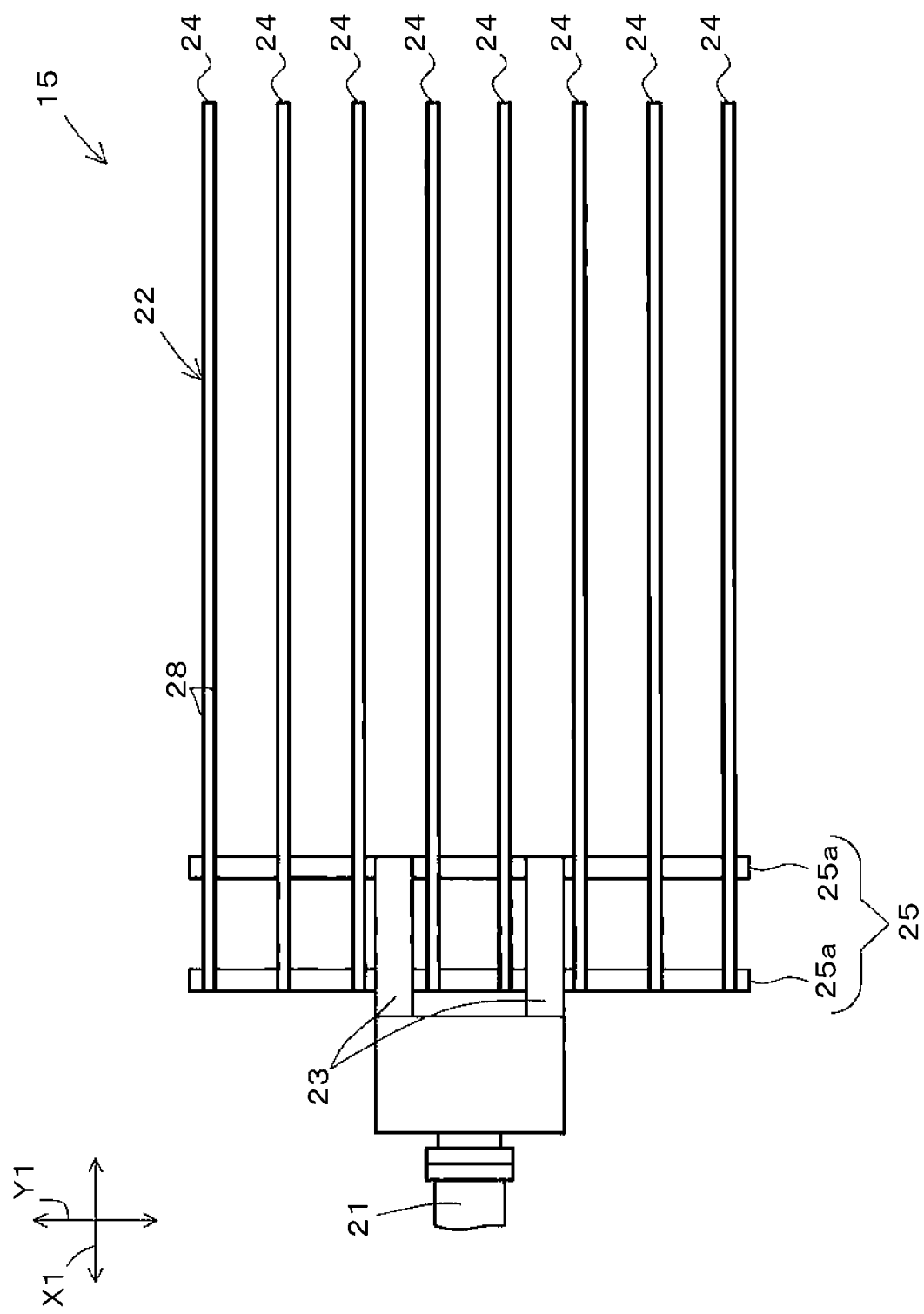
FIG. 3 is a schematic plan view of the workpiece loading device.
Figure 4:
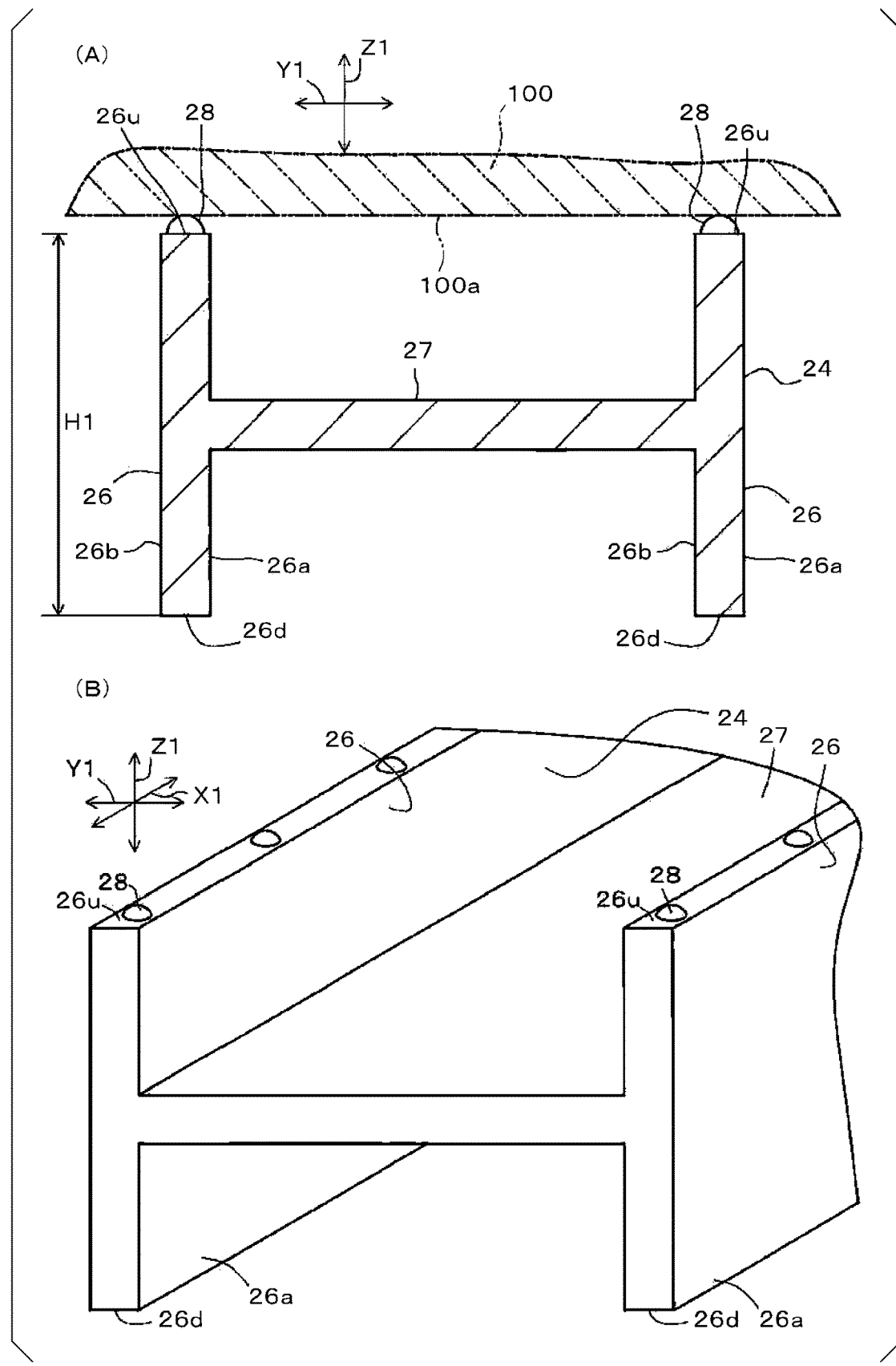
FIG. 4(A) is a cross-sectional view of a workpiece transportation member in the workpiece loading device and shows a state of the workpiece transportation member viewed in a cross section orthogonal to the length direction.
FIG. 4(B) is a perspective view showing the workpiece transportation member alone.

FIG. 3 is a schematic plan view of the workpiece loading device 15. FIG. 4(A) is a cross-sectional view of a workpiece transportation member 24 in the workpiece loading device 15 and shows a state of the workpiece transportation member 24 viewed in a cross section orthogonal to the length direction X1. FIG. 4(B) is a perspective view showing the workpiece transportation member 24 alone.

With reference to FIG. 1 to FIG. 4, in the present embodiment, the workpiece loading device 15 is configured to load the workpiece 100 into one heater unit 5 at a time. The workpiece loading device 15 is installed on the upstream side of the heat treatment furnace 2 in the transportation direction A1. The workpiece transportation device 3 loads the workpiece 100 into the corresponding heater unit 5 through one of the plurality of opening parts 4c.

The workpiece loading device 15 has a moving mechanism 21 and a workpiece transportation fork 22.

The moving mechanism 21 is provided to move the workpiece transportation fork 22. The moving mechanism 21 is, for example, an articulated robot arm. The moving mechanism 21 is configured to be capable of moving the workpiece transportation fork 22 horizontally, vertically, and rotationally. It should be noted that the moving mechanism 21 needs to be configured to be capable of loading the workpiece transportation fork 22 and the workpiece 100 placed on the workpiece transportation fork 22 into the heat treatment furnace 2, and the specific configuration thereof is not limited to robots. An attachment 23 is provided at the tip end portion of the moving mechanism 21, and the workpiece transportation fork 22 is fixed to the attachment 23.

The workpiece transportation fork 22 is provided as a portion on which the workpiece 100 is placed. When the workpiece transportation fork 22 is moved with the moving mechanism 21, the workpiece transportation fork 22 is capable of moving the workpiece 100 placed on the workpiece transportation fork 22.

The workpiece transportation fork 22 has a plurality of (eight in the present embodiment) workpiece transportation members 24 and a linking body 25 connected to the workpiece transportation members 24. The workpiece transportation fork 22 has a configuration where the plurality of workpiece transportation members 24 are arranged at predetermined pitch in the width direction Y1 and is thereby formed into a fork shape as a whole.

It should be noted that, in the present embodiment, the longitudinal direction of the workpiece transportation member 24 will be referred to as the length direction X1. In addition, a direction that is orthogonal to the length direction X1 and in which the plurality of workpiece transportation members 24 are arranged will be referred to as the width direction Y1. In addition, a direction that is orthogonal to both the length direction X1 and the width direction Y1 will be referred to as the height direction Z1. In addition, unless particularly otherwise described, description will be made based on a state where the workpiece transportation fork 22 is in a horizontal support posture. The "horizontal support posture" refers to the posture of the workpiece transportation fork 22 when the workpiece 100 is horizontally placed on the workpiece transportation fork 22.

The linking body 25 is provided as a base portion of the workpiece transportation fork 22. The linking body 25 has, for example, two linking rods 25a extending along the width direction Y1. These two linking rods 25a are fixed to the attachment 23 of the moving mechanism 21. The two linking rods 25a are disposed parallel to each other at an interval in the length direction X1. In the present embodiment, the substantial centers of the linking rods 25a in the width direction Y1 are connected to the attachment 23. The linking body 25 fixes the base end section of each workpiece transportation member 24.

The workpiece transportation member 24 is provided as a skewer-shaped portion of the workpiece transportation fork 22. The workpiece transportation member 24 is a portion on which the workpiece 100 is directly placed, and the workpiece 100 is placed on the upper end portion of the workpiece transportation member 24. The number of the workpiece transportation members 24 and the disposition pitches in the width direction Y1 are appropriately set depending on the shape and dimension of the workpiece 100. In the present embodiment, the individual workpiece transportation members 24 have the same configuration, which is capable of enhancing the versatility of the workpiece transportation member 24, and thus it is possible to further reduce the manufacturing cost of the workpiece transportation fork 22.

The workpiece transportation member 24 has at least one pair of support beams 26 and a connecting portion 27 configured to connect the plurality of support beams 26 to each other.

In the present embodiment, one pair of the support beams 26 are provided. That is, two support beams 26 are provided at an interval in the width direction Y1. The shapes, dimensions, and positions in the height direction Z1 of the individual support beams 26 are set to be the same. In the present embodiment, the pair of support beams 26 are disposed parallel to each other. The support beam 26 is a member that extends in the length direction X1 as the longitudinal direction.

In the present embodiment, the support beam 26 is formed in a rectangular flat plate shape and is disposed such that the width direction Y1 becomes the thickness direction. With this configuration, the support beams 26 are vertically disposed.

As described above, the support beam 26 is formed in a shape that is thin in the width direction Y1 and long in the height direction Z1, and both a right side surface 26a and a left side surface 26b of the support beam 26 in the width direction Y1 are disposed in open spaces and are not disposed in closed spaces. The "closed space" refers to, for example, the inside space of a rectangular space in a case where the workpiece transportation member is rectangular in a cross section orthogonal to the length direction X1. Such a configuration makes it difficult for a temperature difference to be generated between an upper end portion 26u and a lower end portion 26d of the support beam 26.

In the present embodiment, the upper end portion 26u of the support beam 26 is a substantially horizontal flat surface. It should be noted that chamfered portions may be formed at corner portions of the upper end portion 26u. In the present embodiment, the lower end portion 26d of the support beam 26 is a substantially horizontal flat surface. It should be noted that chamfered portions may be formed at corner portions of the lower end portion 26d.

On the upper end portion 26u of the support beam 26, placing portions 28 configured to allow the heated workpiece 100 to be placed are formed. The placing portion 28 may be a flat surface formed of the upper end portion 26u. In a case where the placing portion 28 is a flat surface, one pair of the placing portions 28 and 28 on the pair of the support beams 26 and 26 are flush surfaces having aligned positions in the height direction Z1. In the present embodiment, the placing portion 28 is formed by providing a projection-shaped member on the upper end portion 26u. The projection-shaped members may be discretely disposed in the length direction X1 or may continuously extend in the length direction X1.

With the above-described configuration, the placing portions 28 on one support beam 26 and the placing portion 28 of the other support beam 26 are disposed apart from each other in the width direction Y1. In addition, the interval between the pair of placing portions 28 and 28 in the width direction Y1 is the support span of the workpiece 100 in one workpiece transportation member 24. The pair of placing portions 28 and 28 are apart from each other as described above, whereby radiation heat from a portion 100a of the workpiece 100 positioned between the pair of placing portions 28 and 28 does not easily reach the connecting portion 27.

The pair of support beams 26 and 26 are connected to each other with the connecting portion 27 at a position below the position of the upper end portion 26u.

In the present embodiment, the connecting portion 27 is disposed in the middle portion of each support beam 26 in the height direction Z1, more specifically, substantially at the center in the height direction Z1. In addition, the connecting portion 27 connects the pair of support beams 26 and 26 to each other at one place in the height direction Z1.

As described above, the connecting portion 27 is disposed in the middle portion of the support beam 26 in the height direction Z1, whereby the workpiece transportation member 24 is formed in an H shape when viewed in the length direction X1. The position of the connecting portion 27 in the height direction Z1 needs to be below the position of the upper end portion 26u. For example, the distance from the upper end portion 26u may be approximately ¼ of the height H1 of the support beam 26, may be approximately ½ of the height H1, or may be approximately ¾ of the height H1.

The connecting portion 27 is formed in a rectangular flat plate shape and extends horizontally along the length direction X1. The connecting portion 27 is disposed such that the height direction Z1 becomes the thickness direction. With this configuration, the connecting portion 27 is horizontally disposed. In the present embodiment, the thickness (plate thickness) of the connecting portion 27 and the thickness (plate thickness) of the support beam 26 are the same as each other, but may be different from each other.

The connecting portion 27 and the support beam 26 are in contact with each other throughout the entire region of the support beam 26 in the length direction X1. The connecting portion 27 and the support beam 26 may be integrated by welding or may be integrally formed by rolling, forging, or the like. In a case where a large workpiece 100 is transported with the workpiece transportation fork 22, the workpiece transportation member 24 may be formed of H-section steel.

The workpiece unloading device 16 is disposed on the downstream side of the workpiece loading device 15 and the heat treatment furnace 2 each having the above-described configuration in the transportation direction A1.

In the present embodiment, the workpiece unloading device 16 is configured to unload the workpiece 100 from one heater unit 5 at a time. The workpiece unloading device 16 unloads the workpiece 100 from the corresponding heater unit 5 through one of the plurality of opening parts 4d on the outlet side.

The workpiece unloading device 16 has a moving mechanism 31 and a workpiece transportation fork 32.

The difference between the moving mechanism 31 and the moving mechanism 21 is that the moving mechanism 21 moves the workpiece transportation fork 22 in and out of the opening part 4c. On the other hand, the moving mechanism 31 moves the workpiece transportation fork 32 in and out of the opening part 4d. Since there is no significant difference between the configuration of the moving mechanism 21 and the configuration of the moving mechanism 31 except this point, the moving mechanism 31 will not be described in detail.

The configuration of the workpiece transportation fork 32 is the same as the configuration of the workpiece transportation fork 22, including the fact that the workpiece transportation fork 32 has a plurality of the workpiece transportation members 24. Therefore, the workpiece transportation fork 32 will not be described in detail.

For example, in a configuration where a first connecting portion configured to connect the upper portions of a plurality of support beams and a second connecting portion configured to connect the lower portions of the plurality of support beams are provided, the elongation amount of the first connecting portion and the elongation amount of the second connecting portion, which are attributed to radiation heat from workpieces, are different from each other. As a result, the support beam warps such that the elongation amount of the upper end portion of the support beam, which is attributed to radiation heat, becomes larger than the elongation amount of the lower end portion of the support beam.

Meanwhile, as described above, according to the present embodiment, the support beams 26 and 26 can be connected to each other with one connecting portion 27. With such a configuration, it is possible to more reliably suppress the occurrence in the support beam 26 of the warpage of the workpiece transportation member 24, particularly, warpage causing the elongation amount of the upper end portion 26u of the support beam 26, which is attributed to radiation heat from the workpiece 100, to be larger than the elongation amount of the lower end portion 26d of the support beam 26. Moreover, since the workpiece transportation member 24 is formed of a single material, it is possible to further reduce the manufacturing cost of the workpiece transportation member 24. In addition, it is possible to suppress the warpage of the workpiece transportation member 24 regardless of the heating pattern of the workpiece 100 and the heating temperature of the workpiece 100. Therefore, it is not necessary to replace the workpiece transportation member 24 according to the workpiece 100 having a different heating pattern of the workpiece 100 and the like, and the same workpiece transportation member 24 can be used. Therefore, it is possible to decrease the replacement frequency of the workpiece transportation member 24 in the step of heat-treating the workpiece 100, and thus a low cost relating to the transportation of workpieces is required, and it is possible to further improve the operating rate of the heat treatment device 1.

In addition, according to the present embodiment, when heat coming from the workpiece 100 acts on the workpiece transportation member 24, the workpiece transportation member 24 being deformed to warp downward is suppressed. Therefore, the total height of the workpiece transportation member 24 and the workpiece 100 placed on the workpiece transportation member 24 does not significantly change regardless of the temperature of the workpiece 100. Therefore, at the time of transporting the workpiece 100, the possibility of the workpiece transportation member 24 and the workpiece 100 coming into contact with the opening part 4c on the inlet side and the opening part 4d on the outlet side in the heat treatment furnace 2 becomes significantly low. As a result, a concern of the occurrence of a trouble of the heat treatment furnace 2 or the workpiece transportation member 24 being broken and a trouble of the workpiece 100 being damaged becomes significantly low.

In addition, according to the present embodiment, the connecting portion 27 connects the pair of support beams 26 and 26 to each other at one place in the height direction Z1. According to this configuration, it is possible to more reliably suppress the occurrence in the support beam 26 of the warpage of the workpiece transportation member 24, particularly, warpage causing the elongation amount of the upper end portion 26u of the support beam 26 to be larger than the elongation amount of the lower end portion 26d of the support beam 26.

In addition, according to the present embodiment, the number of the support beams 26 provided at an interval in the width direction Y1 is two, and each support beam 26 is formed in a flat plate shape having the width direction Y1 as the thickness direction. According to this configuration, it is possible to stably support the workpiece 100 with the two support beams 26 and 26 while the amount of heat transmitting from the workpiece 100 to the workpiece transportation member 24 is further reduced by further decreasing the contact area between the workpiece 100 and each support beam 26.

In addition, according to the present embodiment, the connecting portion 27 is disposed in the middle portion of the support beam 26 in the height direction Z1, whereby the workpiece transportation member 24 is formed in an H shape when viewed in the length direction X1. According to this configuration, it is possible to realize the workpiece transportation member 24 having extremely high bending rigidity against the load of the workpiece 100. In addition, since it is possible to decrease the projected area of the connecting portion 27 when viewed from the upper end side of the support beam 26, it is possible to decrease the influence of radiation heat from the workpiece 100. As a result, it is possible to more reliably suppress the warpage of the support beam 26 attributed to the radiation heat. Furthermore, it is possible to make the temperature distribution of the support beam 26 in the thickness direction (width direction Y1) of the support beam 26, which is attributed to the conduction of heat from the workpiece 100 more even. Therefore, it is possible to more reliably suppress the occurrence of a temperature difference in the support beam 26 that causes large warpage.

In addition, according to the present embodiment, the connecting portion 27 is formed in a plate shape extending in the length direction X1. According to this configuration, the connecting portion 27 continuously extends in the length direction X1, whereby it is possible to further enhance the coupling stiffness between the connecting portion 27 and the support beam 26. As a result, the workpiece transportation member 24 is capable of further decreasing the deflection amount (subduction amount) of the workpiece transportation member 24 on the tip end side when the workpiece 100 is placed on the workpiece transportation member 24.

In addition, according to the present embodiment, the workpiece transportation fork 22 is formed of the workpiece transportation members 24 in which warpage attributed to heat from the workpiece 100 is suppressed. Therefore, when the workpiece 100 is placed on the workpiece transportation fork 22, it is possible to more reliably suppress the occurrence of the warpage of the workpiece transportation fork 22. In addition, since it is possible to suppress the warpage of the workpiece transportation fork 22 regardless of the heating pattern of the workpiece 100 and the like, it is not necessary to replace the workpiece transportation fork 22 according to the workpiece 100 having a different heating pattern of the workpiece 100 and the like, and the same workpiece transportation fork 22 can be used. Therefore, it is possible to decrease the replacement frequency of the workpiece transportation fork 22 in the heat treatment device 1, and thus it is possible to further improve the operating rate of the heat treatment device 1.

Hitherto, the embodiment of the present invention has been described, but the present invention is not limited to the above-described embodiment. The present invention can be modified in a variety of manners within the scope of the claims. It should be noted that, hereinafter, differences from the above-described embodiment will be mainly described, and the same configuration will be given the same reference numeral in drawings and will not be described in detail.

Figure 5:
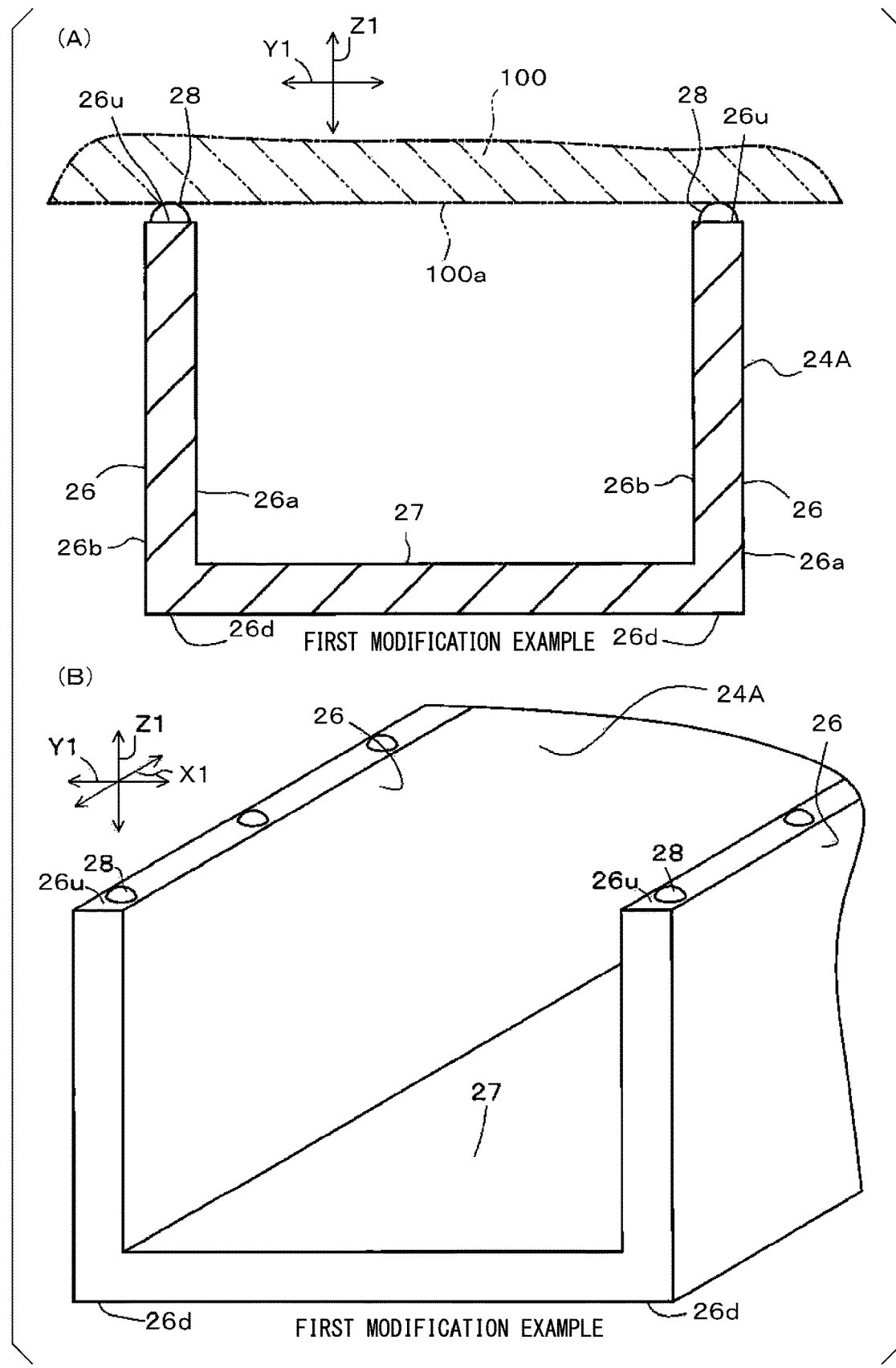
FIG. 5(A) is a cross-sectional view of the workpiece transportation member according to a first modification example.
FIG. 5(B) is a perspective view of the workpiece transportation member shown in FIG. 5(A).

(1) In the above-described embodiment, the configuration where the workpiece transportation member 24 has an H shape has been described as an example. However, the configuration may not be as described above. Instead of the workpiece transportation member 24, a U-shaped workpiece transportation member 24A as shown in FIG. 5(A) and FIG. 5(B) may be used. FIG. 5(A) is a cross-sectional view of the workpiece transportation member 24A according to a first modification example, and FIG. 5(B) is a perspective view of the workpiece transportation member 24A shown in FIG. 5(A). In this configuration, in the workpiece transportation member 24A, the connecting portion 27 is adjacent to the lower end portions 26d and 26d of one pair of the support beams 26 and 26 and is fixed to the lower end portions 26d and 26d. That is, the difference between the workpiece transportation member 24 and the workpiece transportation member 24A is the position of the connecting portion 27 in the height direction Z1. In addition, the connecting portion 27 is disposed in the lower end portion 26d of the support beam 26 in the height direction Z1, whereby the workpiece transportation member 24 is formed in a U shape when viewed in the length direction X1.

As described above, in the heat treatment furnace 2, the heater units 5 and 5 arranged vertically are not separated with a partition wall and directly face each other. Therefore, the workpiece transportation fork 22 that has been loaded into a predetermined heater unit 5 also receives radiation heat from the far-infrared heater 11 in the heater unit 5 directly below the predetermined heater unit 5. However, the amount of radiation heat transmitting from directly below the heater unit 5 described above to the workpiece transportation fork 22 is smaller than the amount of radiation heat transmitting from the loaded heater unit 5 described above to the workpiece transportation fork 22. Therefore, in the workpiece transportation member 24A, even if the connecting portion 27 is disposed in the lower end portion 26d of the support beam 26, the heat elongation amount of the connecting portion 27 attributed to radiation heat from directly below the heater unit 5 described above is small.

As described above, according to the first modification example, the connecting portion 27 is disposed in the lower end portion 26d of the support beam 26 in the height direction Z1, whereby the workpiece transportation member 24A is formed in a substantially U shape when viewed in the length direction X1. According to this configuration, it is possible to realize the workpiece transportation member 24A having sufficiently enhanced bending rigidity against the load of the workpiece 100.

Figure 6:
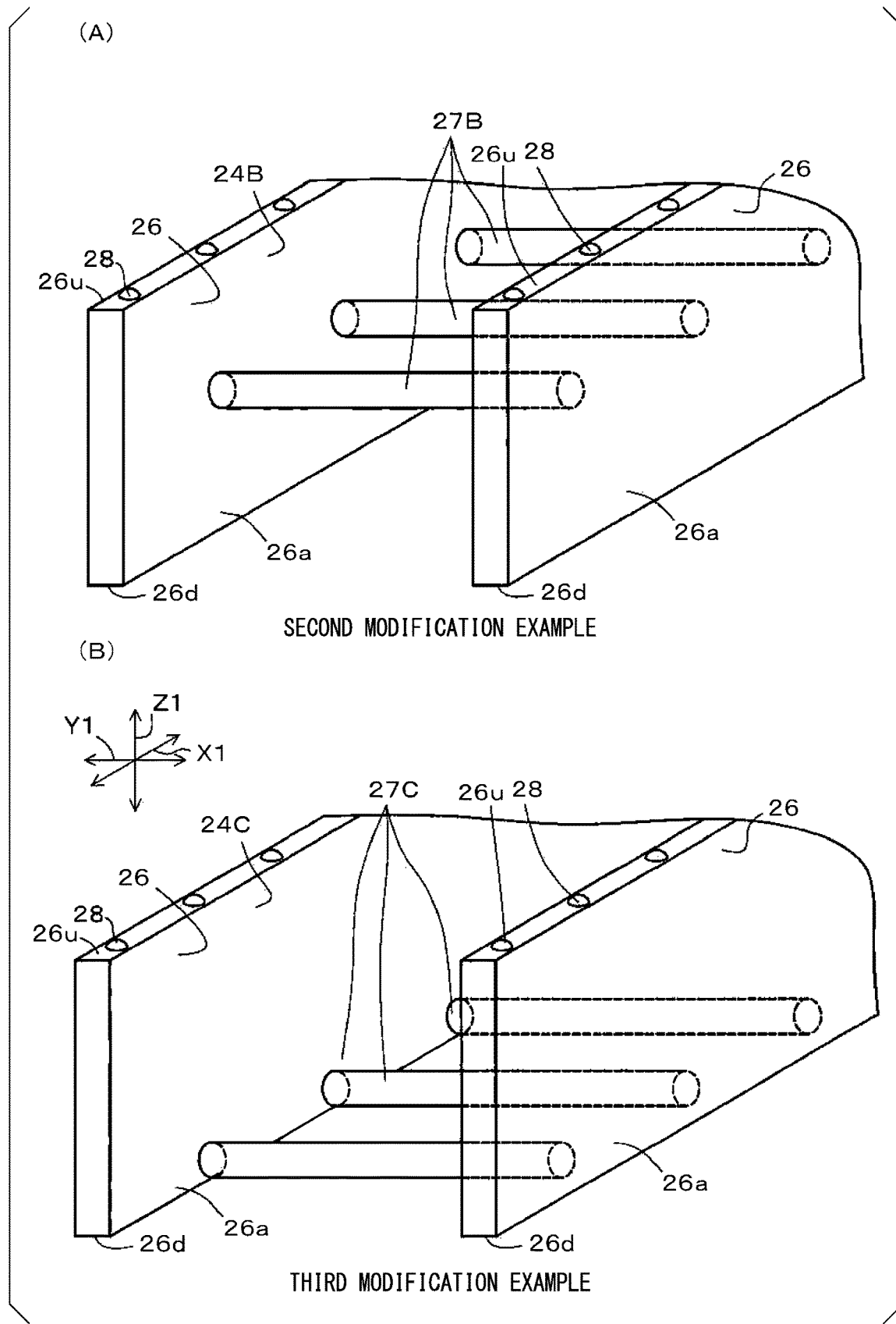
FIG. 6(A) is a perspective view of the workpiece transportation member according to a second modification example.
FIG. 6(B) is a perspective view of the workpiece transportation member according to a third modification example.

(2) In the above-described embodiment and modification example, the form where the connecting portion 27 has a flat plate shape that extends along the length direction X1 has been described as an example. However, the form may not be as described above. For example, instead of the workpiece transportation members 24 and 24A, a workpiece transportation member 24B shown in FIG. 6(A) or a workpiece transportation member 24C shown in FIG. 6(B) may be used. FIG. 6(A) is a perspective view of the workpiece transportation member 24B according to a second modification example, and FIG. 6(B) is a perspective view of the workpiece transportation member 24C according to a third modification example.

With reference to FIG. 6(A) and FIG. 6(B), in the second modification example, a plurality of connecting portions 27B are provided at intervals in the length direction X1 in the workpiece transportation member 24B formed in an H shape when viewed in the length direction X1. Similarly, in the third modification example, a plurality of connecting portions 27C are provided at intervals in the length direction X1 in the workpiece transportation member 24C formed in a U shape when viewed in the length direction X1.

The connecting portions 27B and 27C are each disposed at equal pitches in the length direction X1, but may be disposed at unequal pitches. The connecting portions 27B and 27C each extends straight in the width direction Y1, and both end portions of each of the connecting portions 27B and 27C are fixed to the corresponding support beams 26. The shape of each of the connecting portions 27B and 27C may be a round bar shape, may be a square column shape, or may be a flat plate shape.

The plurality of connecting portions 27B are provided at aligned positions in the height direction Z1 and are disposed at, for example, the center of the support beam 26 in the height direction Z1. The position of each connecting portion 27B in the height direction Z1 is set in the same manner as the position of the connecting portion 27. In addition, the plurality of connecting portions 27C are provided at aligned positions in the height direction Z1 and are disposed at, for example, the lower end portion 26d of the support beam 26 in the height direction Z1.

With the above-described configuration, the connecting portions 27B and 27C connect the pair of support beams 26 and 26 to each other at one place in the height direction Z1. It should be noted that the positions of the plurality of connecting portions 27B in the height direction Z1 may not coincide with each other. For example, one connecting portion 27B may be disposed at the center of the support beam 26 in the height direction Z1, and another connecting portion 27B may be disposed close to the upper end portion 26u or close to the lower end portion 26d of the support beam 26 in the height direction Z1. Similarly, the positions of the plurality of connecting portions 27C in the height direction Z1 may not coincide with each other. For example, one connecting portion 27C may be disposed at the lower end portion 26d of the support beam 26 in the height direction Z1, and another connecting portion 27C may be disposed close to the center of the support beam 26 in the height direction Z1.

As described above, according to the second modification example and the third modification example, the plurality of connecting portions 27B and 27C are each provided at intervals in the length direction X1. According to this configuration, the plurality of connecting portions 27B or the plurality of connecting portions 27C support the support beams 26 in cooperation with each other, whereby it is possible to further enhance the coupling stiffness between the connecting portion 27B and 27C and the corresponding support beam 26. As a result, the workpiece transportation member 24B and 24C is capable of further decreasing the deflection amount of the workpiece transportation member 24B and 24C on the tip end side when the workpiece 100 is placed on the workpiece transportation member 24B and 24C. Furthermore, the connecting portions 27B and 27C are capable of reducing the amount of radiation heat received from the workpiece 100. As a result, it is possible to more reliably suppress the warpage of the support beam 26 attributed to the radiation heat.

Figure 7:
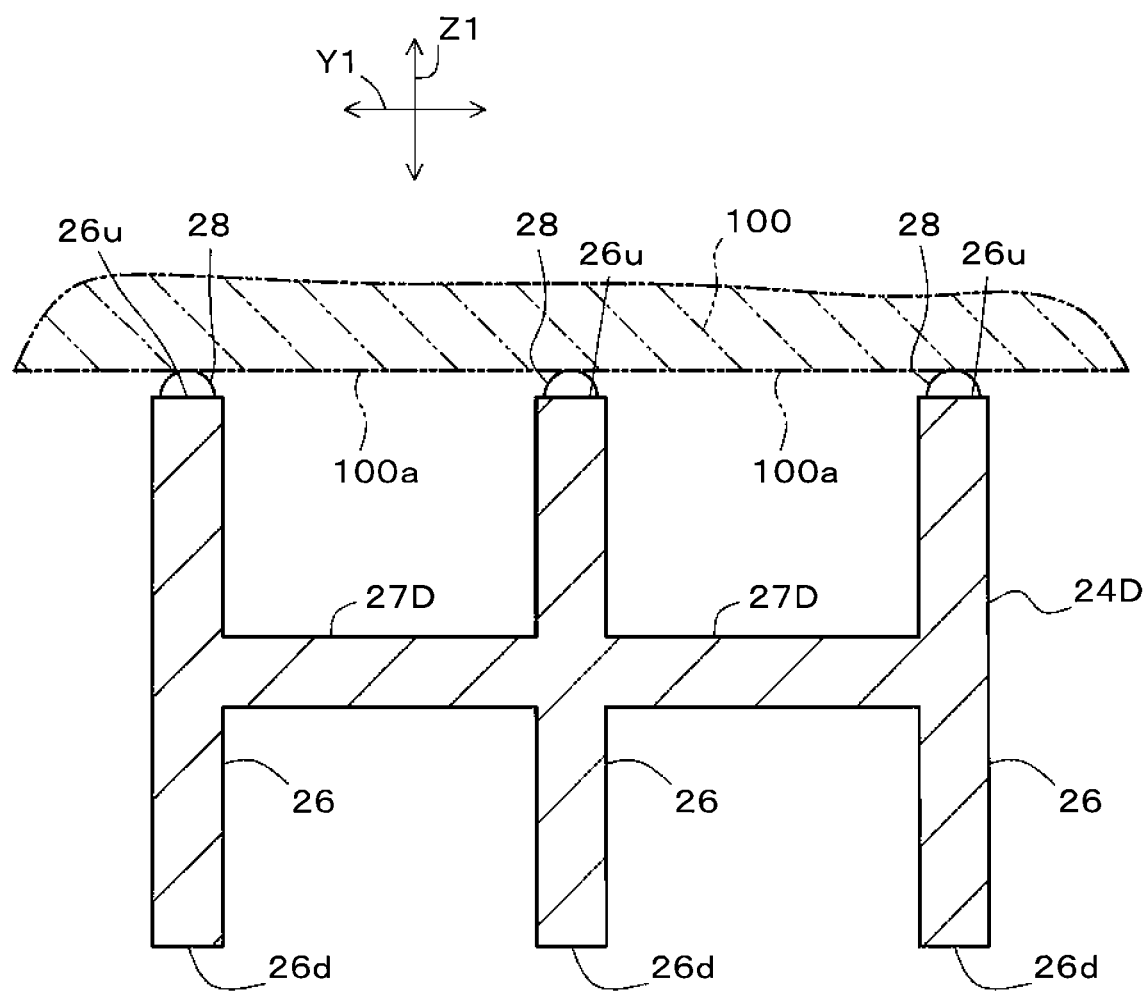
FIG. 7 is a schematic cross-sectional view of the workpiece transportation member according to a fourth modification example.

(3) In the above-described embodiment and the individual modification examples, the form where one pair of the support beams 26 are provided has been described as an example. However, the form may not be as described above. For example, instead of the workpiece transportation members 24, 24A, 24B, and 24C, a workpiece transportation member 24D may be provided as shown in FIG. 7. FIG. 7 is a schematic cross-sectional view of the workpiece transportation member 24D according to a fourth modification example.

The workpiece transportation member 24D has three support beams 26. These support beams 26 are disposed at equal pitches or at unequal pitches in the width direction Y1. In addition, among the three support beams 26, the support beams 26 facing each other in the width direction Y1 are connected to each other with a connecting portion 27D. A single connecting portion 27D is formed in a flat plate shape and extends in the length direction X1 or a plurality of connecting portions 27D are provided at intervals in the length direction X1. The connecting portion 27D needs to be disposed at a position below the position of the upper end portion 26u of the support beam 26 in the height direction Z1, may be disposed at the center of the support beam 26 in the height direction Z1, or may be disposed at the lower end portion 26d of the support beam 26.

INDUSTRIAL APPLICABILITY

The present invention is widely applicable as workpiece transportation members, workpiece transportation devices, and heat treatment devices.

BRIEF DESCRIPTION OF THE REFERENCE SYMBOLS

1 Heat treatment device
2 Heat treatment furnace
3 Workpiece transportation device
22 Workpiece transportation fork
24, 24A, 24B, 24C, 24D Workpiece transportation member
26 Support beam
26d Lower end portion of support beam
26u Upper end portion
27, 27B, 27C, 27D Connecting portion
28 Placing portion
100 Workpiece
X1 Length direction
Y1 Width direction
Z1 Height direction

The invention claimed is:

1. A workpiece transportation member comprising:
at least one pair of support beams that each have a configuration where a placing portion configured to allow a heated workpiece to be placed is provided at an upper end portion, extend in a predetermined length direction, and are disposed at an interval in a width direction orthogonal to the length direction; and
a connecting portion configured to connect the at least one pair of support beams to each other at a position below a position of the upper end portion,
wherein the connecting portion and the support beam are in contact with each other throughout the entire region of the support beam in the length direction;
wherein the connecting portion connects the at least one pair of support beams to each other at one place in a height direction orthogonal to both the length direction and the width direction;
wherein two support beams are provided at an interval in the width direction, and
each of the support beams is formed in a flat plate shape having the width direction as a thickness direction; and
wherein the connecting portion is disposed in a middle portion of the support beam in the height direction, whereby the workpiece transportation member is formed in an H shape when viewed in the length direction.

2. The workpiece transportation member according to claim 1,
wherein the connecting portion is formed in a plate shape extending in the length direction.

3. The workpiece transportation member according to claim 1,
wherein a plurality of the connecting portions are provided at an interval in the length direction.

4. A workpiece transportation device comprising:
a workpiece transportation fork formed in a fork shape as a whole by having a configuration where a plurality of the workpiece transportation members according to claim 1 are arranged in the width direction.

5. A heat treatment device comprising:
the workpiece transportation device according to claim 4; and
a heating furnace configured to heat a workpiece that is transported by the workpiece transportation device.

* * * * *